Figure 1:
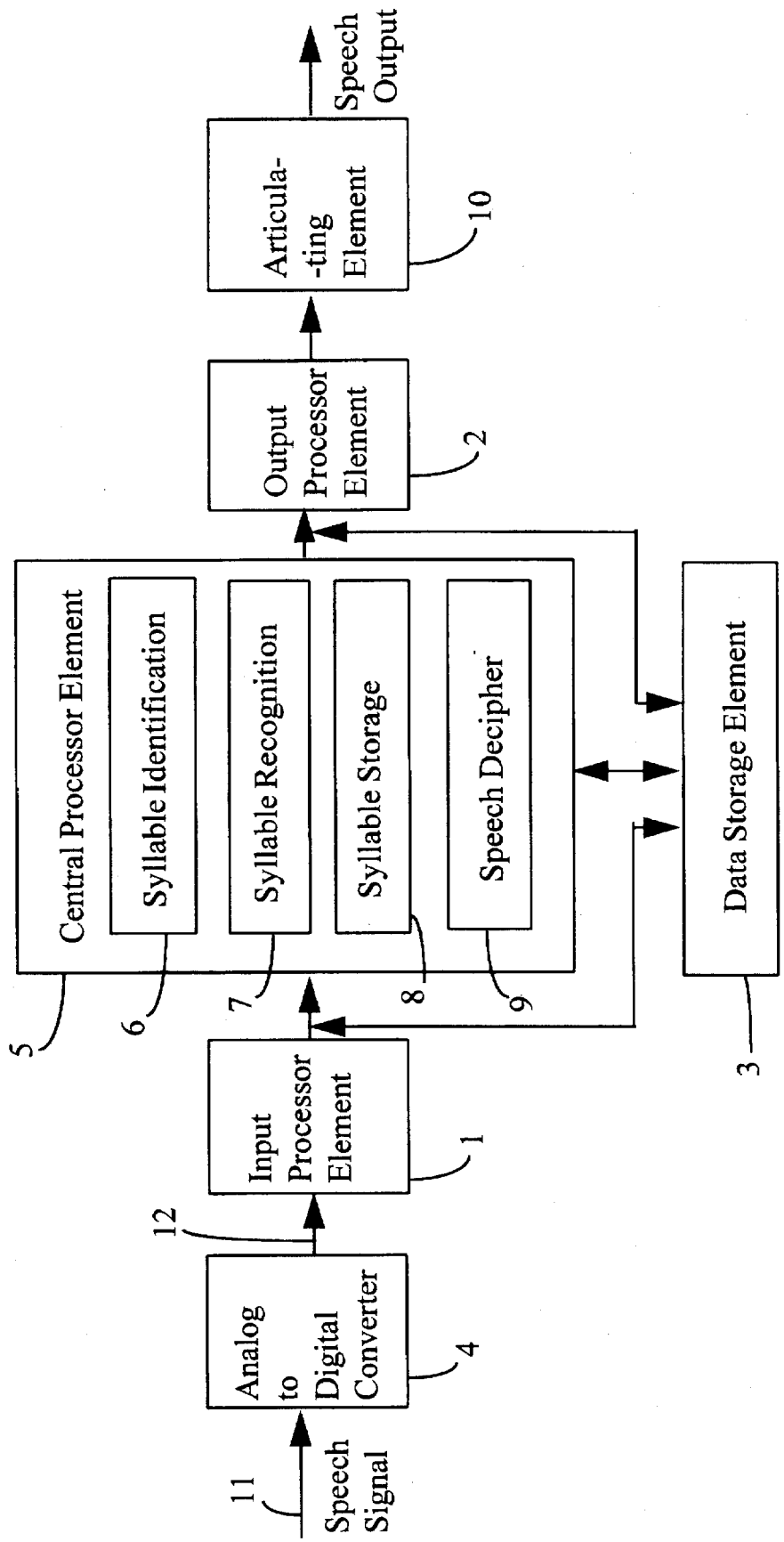

United States Patent [19]

Singhal

[11] Patent Number: 5,675,705
[45] Date of Patent: Oct. 7, 1997

[54] SPECTROGRAM-FEATURE-BASED SPEECH SYLLABLE AND WORD RECOGNITION USING SYLLABIC LANGUAGE DICTIONARY

[76] Inventor: Tara Chand Singhal, P.O. Box 5075, Torrance, Calif. 90510

[21] Appl. No.: 475,767

[22] Filed: Jun. 7, 1995

Related U.S. Application Data

[63] Continuation-in-part of Ser. No. 126,797, Sep. 27, 1993, abandoned.

[51] Int. Cl.[6] ............................... G10L 7/08; G10L 9/06
[52] U.S. Cl. ...................... 395/2.63; 395/2.18; 395/2.66; 395/2.77
[58] Field of Search ...................... 395/2.6, 2.62, 395/2.63, 2.66, 2.14, 2.15, 2.16, 2.18; 381/43

[56] References Cited

U.S. PATENT DOCUMENTS

| | | | |
|---|---|---|---|
| 4,707,858 | 11/1987 | Fette | 395/2.6 |
| 4,813,076 | 3/1989 | Miller | 395/2.63 |
| 4,820,059 | 4/1989 | Miller et al. | 395/2.63 |
| 5,189,727 | 2/1993 | Guerreri | 395/2.4 |

OTHER PUBLICATIONS

James L. Flanagan, Speech Analysis, Synthesis, and Perception, 2nd ed., Springer–Verlag, pp. 163–181 1972.

A. S. Crowe, "Generalized Centroids: A New Perspective on Peak Picking and Formant Estimation," Seventh FASE Symposium 1988.

Marie–Odile Berger and Yves Laprie, "Global active method for automatic formant tracking guided by local processing," 11th IAPR International Conference on Pattern Recognition, vol. III, pp. 598–601 Aug. 1992.

Masahide Sugiyama, "Automatic Language Recognition Using Acoustic Features", Proc. IEEE ICASSP '91, pp. 813–816 May 1991.

Yeshwant K. Muthusamy, Ronald A. Cole, and Murali Gopalakrishnan, "A Segment–Based Approach to Automatic Language Identification", Proc. IEEE ICASSP '91, pp. 353–356 May 1991.

Michael Savic, Elena Acosta, and Sunil K. Gupta, "An Automatic Language Identification System", Proc. IEEE ICASSP '91, pp. 817–820 May 1991.

Marc A. Zissman, "Comparison of Four Approaches to Automatic Language Identification of Telephone Speech", IEEE Trans. on Speech and Audio Processing, vol. 4, No. 1, pp. 31–44 Jan. 1996.

*Primary Examiner*—Allen R. MacDonald
*Assistant Examiner*—Tālivaldis Ivars Šmits

[57] ABSTRACT

A speech recognizing device performing speech syllable recognition and language word identification. The speech syllable recognition is performed on an ensemble composed of nearly one thousand syllables formed by the human vocal system, which allows for variations caused by language dialects and speech accents. For syllable recognition, the nearly one thousand speech syllables, using a spectrogram-feature-based approach, are parsed in a hierarchical structure based on the region of the vocal system from where the syllable emanated from, root syllable from that vocal region, vowel-caused variation of the root syllable, and syllable duration. The syllable's coded representation includes subcodes for each of the levels of this hierarchical structure. For identification, speech words composed of sequences of coded syllables are mapped to known language words and their grammatical attribute, using a syllabic dictionary where the same words spoken differently map to a known language word.

20 Claims, 7 Drawing Sheets

SPECTROGRAM-FEATURE-BASED SPEECH SYLLABLE AND WORD RECOGNITION USING SYLLABIC LANGUAGE DICTIONARY

CROSS REFERENCE

This application is a continuation in part of U.S. patent application bearing Ser. No. 08/126,797 filing date Sep. 27, 1993, title "Speech Processor" of Tara Chand Singhal, abandoned.

BACKGROUND

This invention relates to a speech processor. In current speech processing methods and devices, the spoken word is compared against a pre-stored sound pattern to identify the spoken word from a known set of words. Using these methods and devices the comparison is limited to a recognition of a limited set of the spoken words, because of the limitation of recognizing a large number of words using these approaches.

It is believed, that it is possible to have the speech recognition done by isolating and then recognizing the individual speech syllables that comprise most human uttered sound in the form of a language. Identifying the ensemble of speech syllables of which most human speech is made, and then using them to process the meaning of speech is preferable, resulting in unlimited or total speech identification.

A device that would enable the recognition of the speech syllable ensemble, then storage and processing of that ensemble of sound syllables is disclosed.

SUMMARY

A device for speech syllable ensemble identification, speech syllable ensemble recognition, speech syllable ensemble digital storage, and deciphering of speech made up of ensemble of syllables is disclosed.

All spoken speech in most commonly used languages is composed of a root speech syllable, vowel caused variation of the root speech syllable, and the duration or length of the speech syllable.

There are approximately 30 root sound syllables emanating from different regions of a human vocal system. There are seven possible regions within the human vocal system giving the speech syllable different identification characteristics. When spoken the root sound syllables are modified by their vowel variations. The vowel variation provides eleven different variations for each of the root sound syllables.

The duration of the speech syllable is represented in half and full categories. In some cases two root syllables create a compound sound where a root speech syllable is compounded with another syllable which rides over or modifies the root sound, similar in effect to the vowel modifying a root sound. A sound syllable that rides over another syllable is treated as a quarter length sound syllable.

Combinations of root sound with their vowel and duration variations gives a large ensemble of sound syllables of which most spoken speech irrespective of language and person speaking is comprised of. This ensemble gives a upper bound of approximately a little under 1000 sound syllables, that once identified, will lead to identification of all spoken languages.

The root speech syllables produced from the different regions of the human vocal system bear different signature characteristics of them. A signature of a speech syllable is defined by change in the sound energy in frequency and time. This sound energy of a syllable is termed a Syllable Energy Patch, which is characterized by a three dimensional graphical representation of sound energy (spectrogram). The location of the Syllable Energy Patch in time and frequency along with the magnitude and spatial relationship of the frequency components of the patch uniquely identifies a speech syllable.

The change in frequency energy characteristics over time is computed by computing overlapping sliding frequency transforms of the time segments of the speech waveform. The overlapping is accomplished by repeatably sliding over successive intervals along the time signal yielding identification of frequency components and their variation in time.

The syllable represented by the Syllable Energy Patch is recognized by comparing the energy characteristics to a syllable recognition characteristic. The recognition is performed in a signal processing approach, where the higher or outer level characteristics are recognized first. The recognized syllable is stored in a digital word by using a numeric code for each of the syllable's attributes.

A group of syllables forming a speech word are compared to a sound syllable based dictionary to identify the language word. Once the language word is identified, it is used to decipher the meaning of speech and create an appropriate speech or non speech response. For a speech response, the speech syllables are articulated using an articulating element.

DRAWINGS

These and other features, aspects and advantages of the present invention will become better understood with regards to the following description, appended claims and accompanying drawings, where:

FIG. 1. Block Diagram of speech processing device

Figure 2:
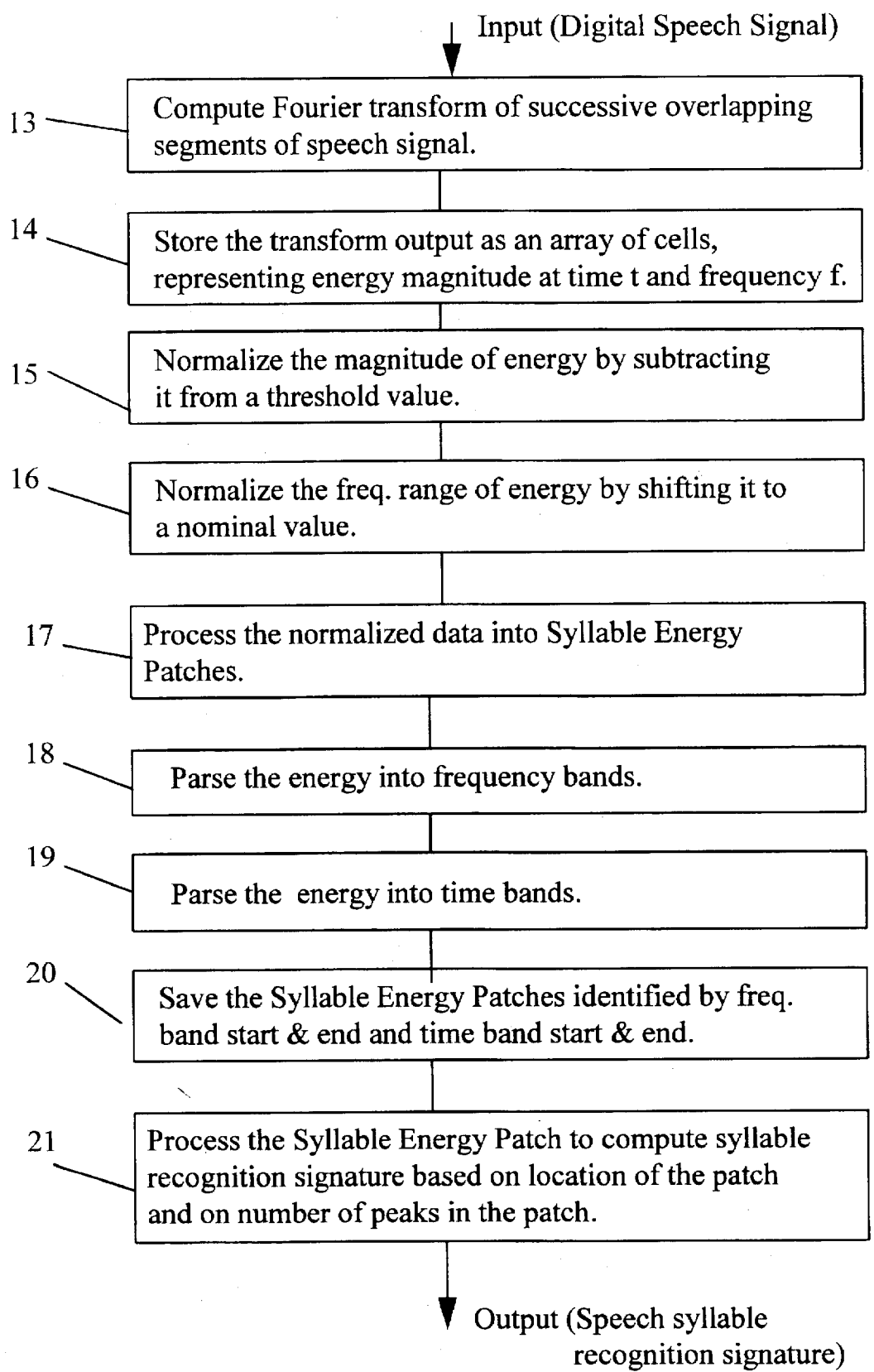

FIG. 2. Logic of Sound Syllable identification

Figure 3:
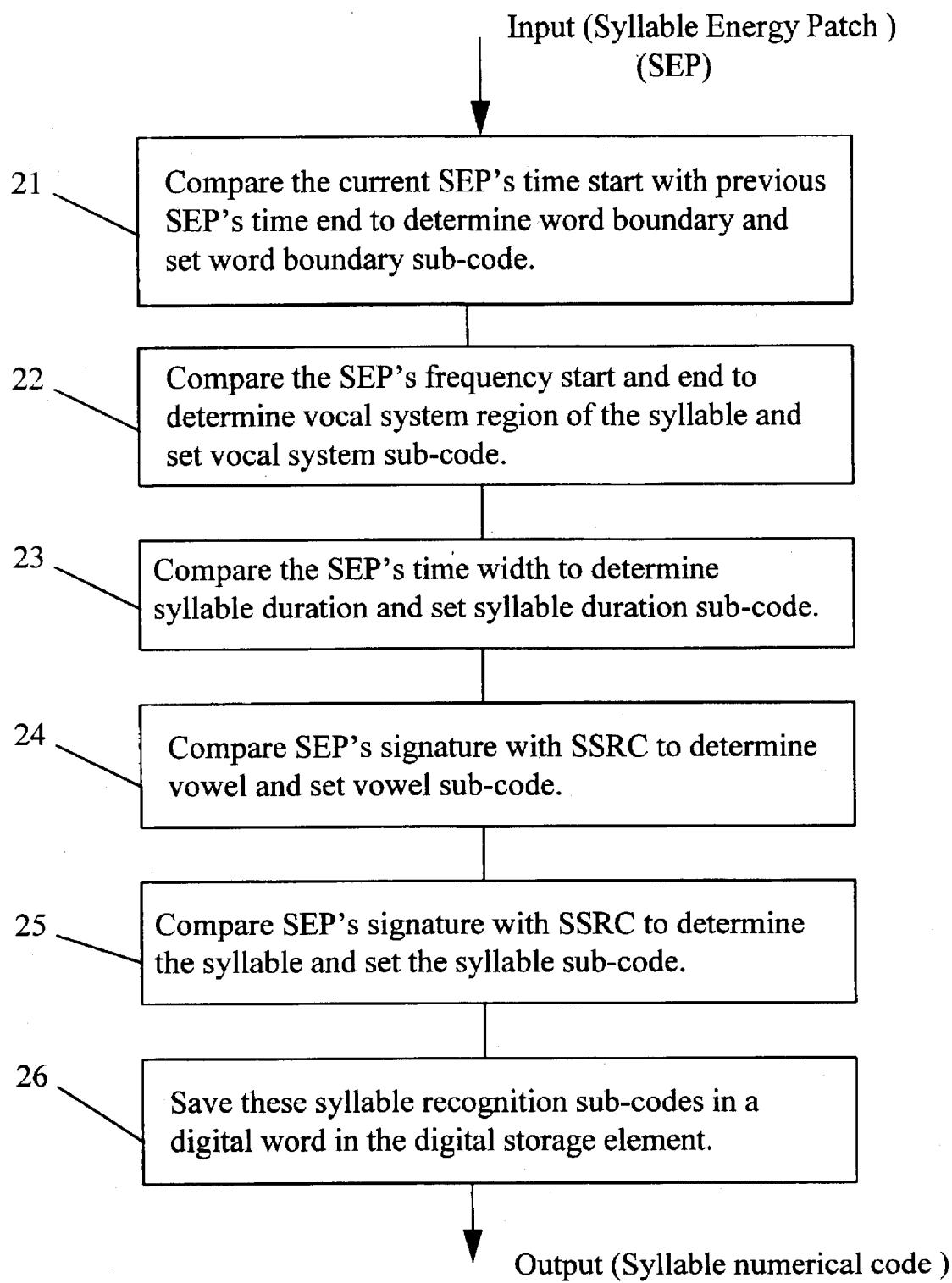

FIG. 3. Logic of Sound syllable recognition

Figure 4:
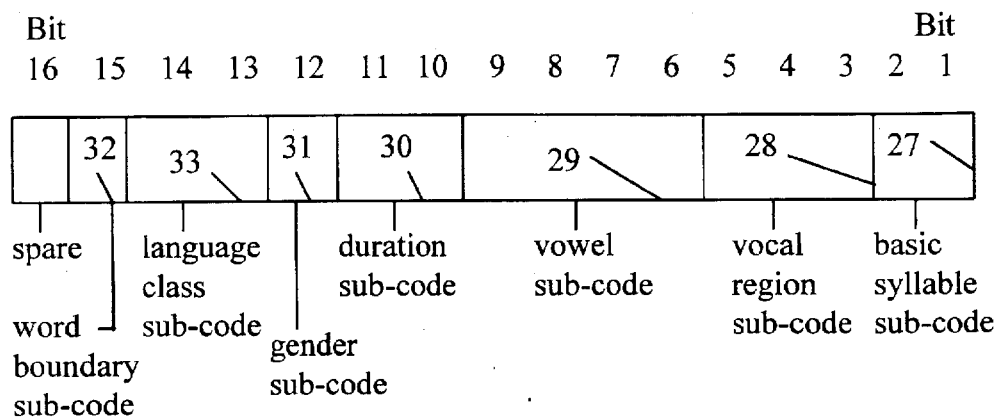

FIG. 4. Storage of Sound syllable and language word in Digital data storage element.

Figure 5:
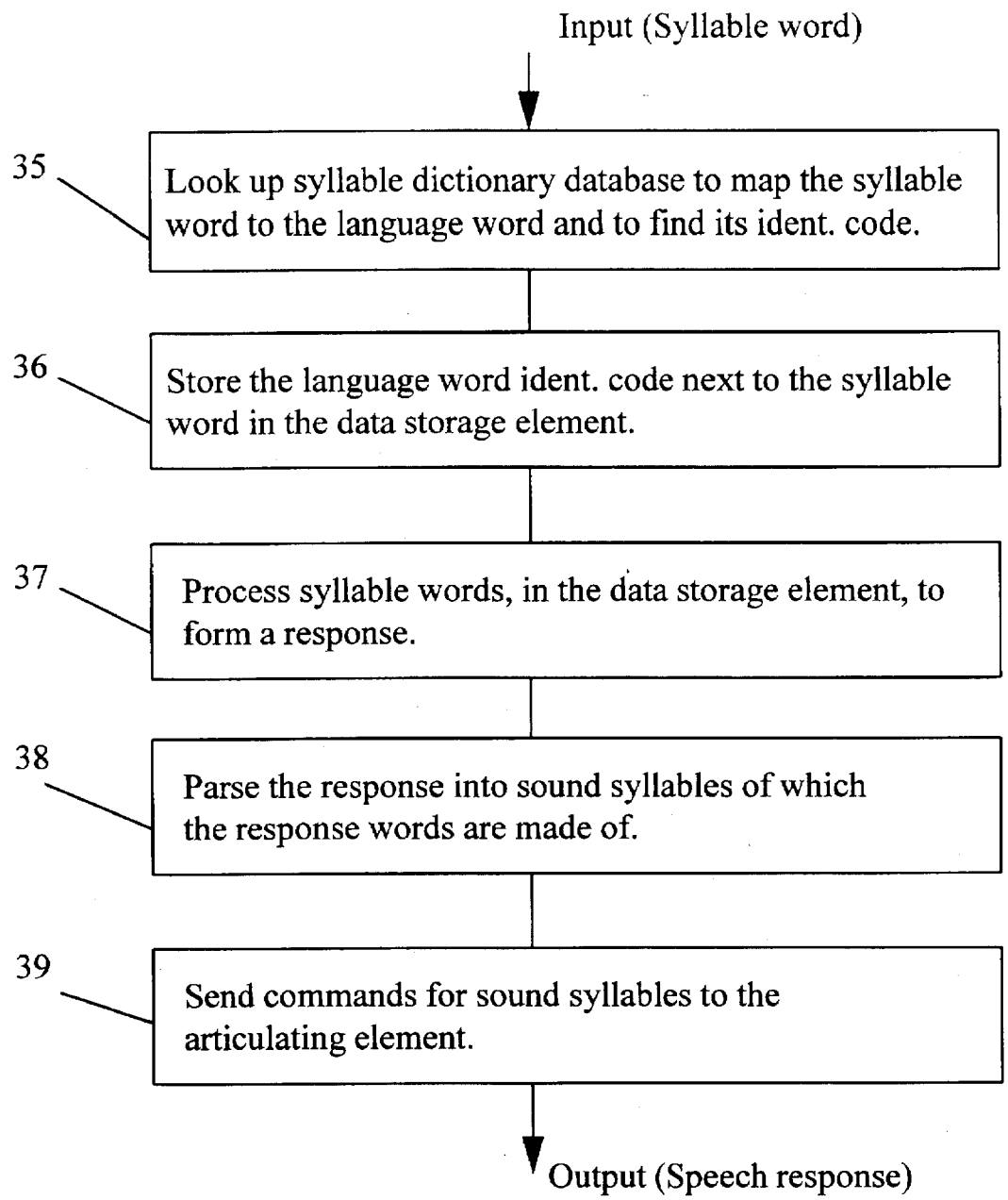

FIG. 5. Logic of Speech deciphering

Figure 6A:
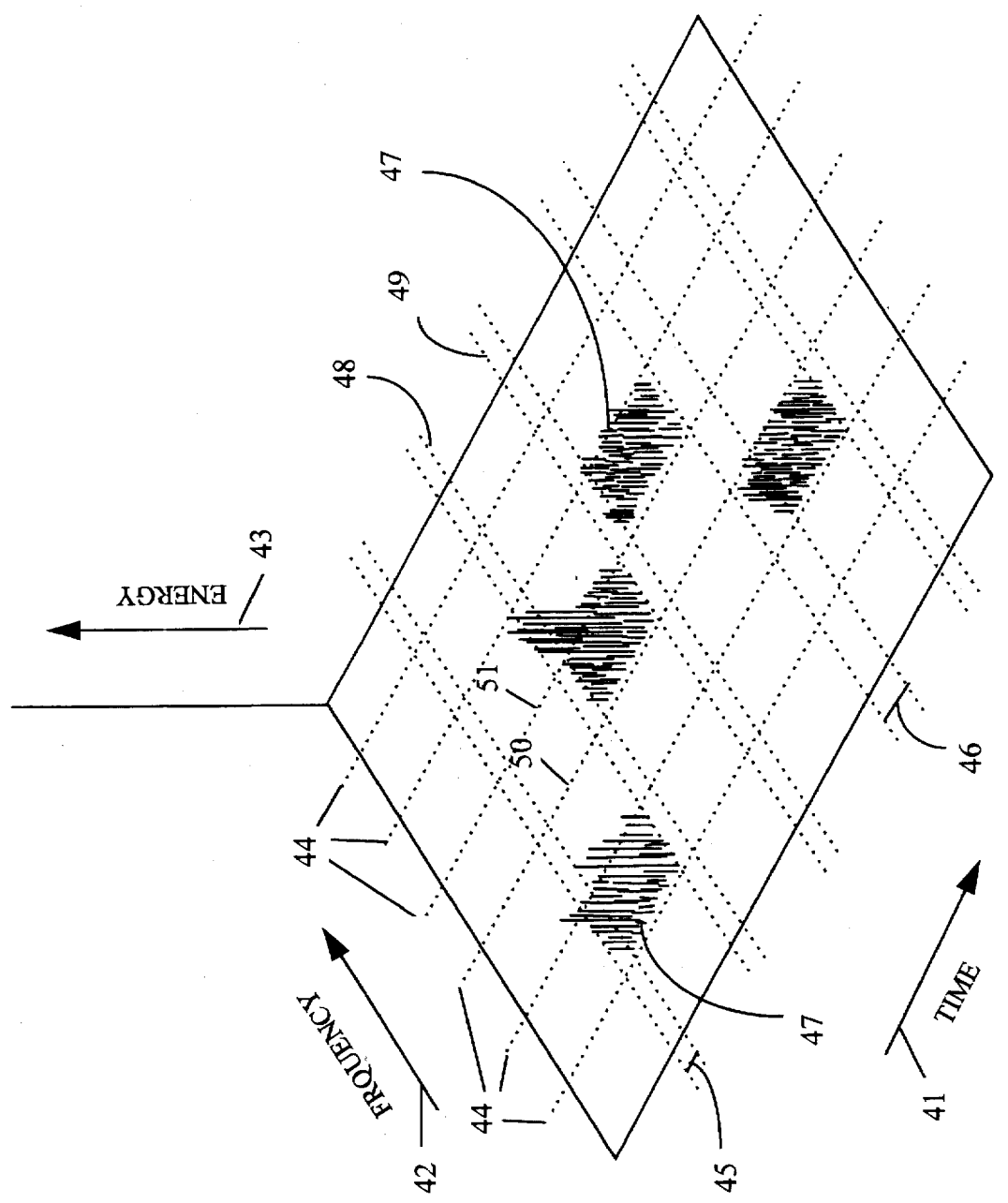

FIG. 6A. A perspective view of Syllable Energy Patches (SEPs) in time and frequency domain.

Figure 6B:
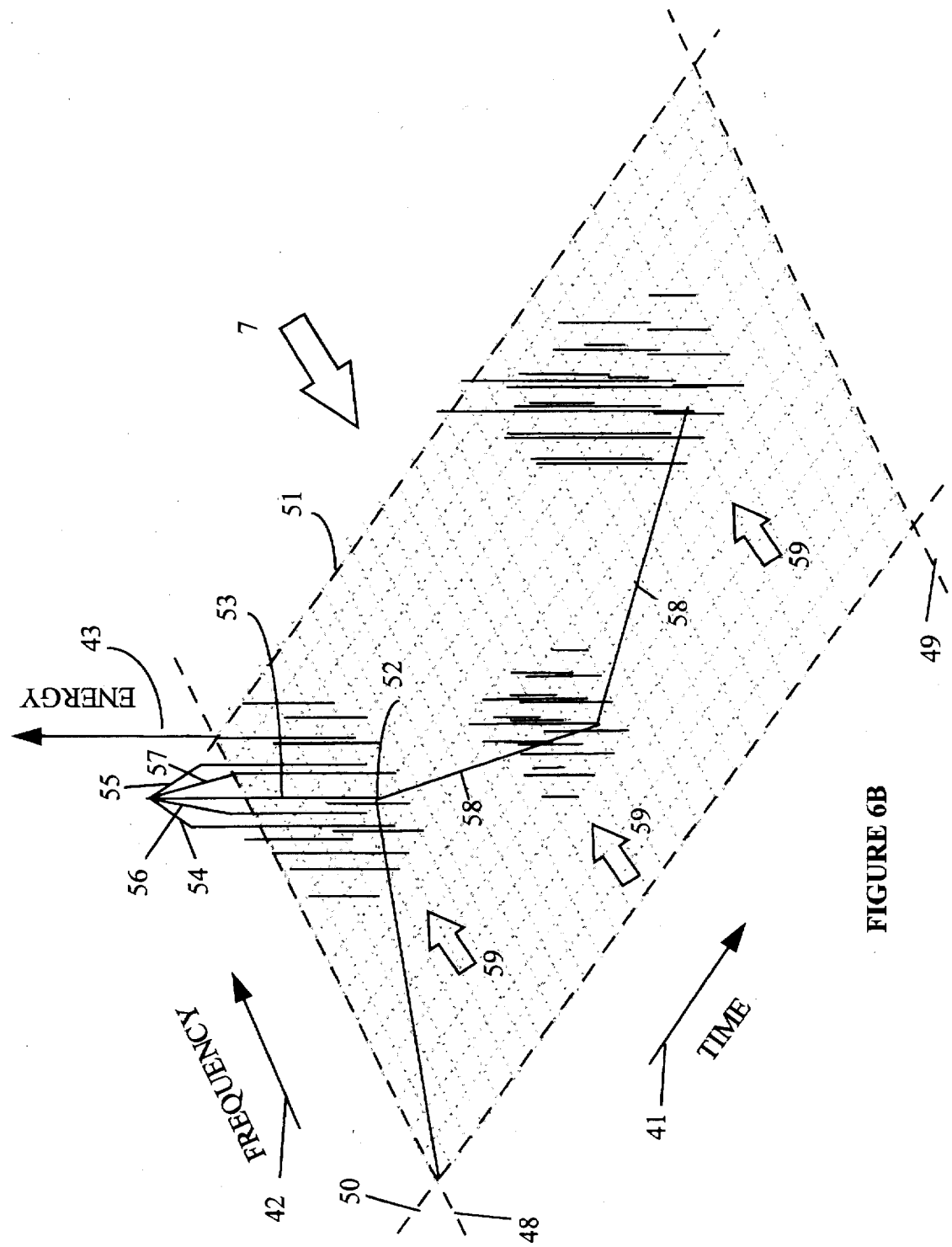

FIG. 6B. An individual SEP showing its syllable signature characteristics or features.

DESCRIPTION

A device based on spoken language sound syllable ensemble identification, sound syllable ensemble digital storage, digital signal processing for sound ensemble recognition, is disclosed.

A sound syllable, from the ensemble of spoken sound syllables, has three attributes. These are: the basic sound syllable itself, vowel caused variation of the basic sound syllable, and the duration or length of the sound syllable. All spoken sound in most commonly used languages is composed of the ensemble of basic sound syllables modified by their attributes.

The syllables of spoken sound emanate from different regions in the human vocal system. There are seven possible regions, giving the sound syllable different identification characteristics. These regions are: (a) tongue using rear palate, (b) tongue using upper palate, (c) tongue using front palate just behind the front teeth, (d) tongue using teeth and lower lip, (e) lips, (f) aspiration with tongue in different areas modulating air flow, and (g) the nasal resonance combination.

The length of the sound syllable is represented in half and full categories. For example, r sound in fixer, tailor, furnace and thunder is half length, whereas the r sound in radio, ram, railway is full length. Also there is a compound sound where a basic sound syllable is compounded with another sound which rides over or modifies the basic sound, similar to the vowel modifying a basic sound, as opposed to being a separate sound syllable. For example the r sound in friend, great, brown is compounded on to the first syllable of the word. In each of these words, the r sound syllable rides on and is compounded with the first syllable. Compound sounds are restricted to only certain sounds, such as r and a few others. A compound sound syllable is treated as a quarter length sound syllable.

The vowel variation provides eleven different variations for each of the basic sound. The vowel variation are difficult to represent in english alphabet but could be approximated with these sounds: a, aa, e, ee, o, oo, ai, aii, ao, auo, and ung.

There are 30 basic sounds, (4 from tongue using rear palate, 4 from tongue using middle palate, 4 from tongue using front palate just behind the upper teeth, 4 from lips using lower teeth, 4 from lips, 5 from nasal combination, and 5 aspirated). All of these basic sounds are difficult to represent in english alphabet but could be approximated with these sounds:

| ka | kha | ga | gha | ynj |
| ca | cha | ja | jha | za |
| ta | tha | da | dha | na |
| pa | pha | ba | bha | ma |
| ya | ra | la | va | sha |
| ssha | sa | ha | ang | tra |

Combinations of basic sound with their vowel and length variations gives a large ensemble of sound syllables of which all spoken speech irrespective of language and person speaking is comprised of. This ensemble gives a total upper bound of 30 times 11 times 3=990 different sound syllables. This upper bound of approximately a little under 1000 sound syllables, that once identified, will lead to identification of all spoken languages. Speech, once it is parsed into its basic sound syllables, their vowel and length variations, gives a unique representation of all spoken sound.

The basic sound syllables produced from the different regions of the human vocal system bear different signature characteristics of them. A signature of a sound syllable is defined by a three dimensional graphical representation, having the frequency components spread along the y axis, their magnitudes spread along the z axis and the time spread along the x axis. From this three dimensional signature plot, magnitude and spatial relationship in both x and y axis of the frequency components will uniquely identify a sound syllable.

The three dimensional signature of a sound syllable is produced by computing overlapping and sliding Fourier transform on a time sampled signal of the sound energy.

The frequency energy characteristic spread over time (spectrogram) is computed by computing overlapping frequency transforms of the time segments of the speech waveform. For illustration only, using a sampling frequency of 40.96 KHz, a 1/10 sec. duration waveform would contain 4096 samples. A 1024 point frequency transform of this signal length would be performed. It will be, repeatably slided over successive, overlapping 1/100 sec. intervals along the time signal yielding identification of frequency components and their variation in time. The resultant analysis spread along x, y and z axis as explained below will enable digital signal processing to be performed on the speech signal.

A device for recognizing these sound syllables is described. This device constructs three dimensional signature plot for each sound syllable, which then the device processes to identity the sound syllable. The operation of this device is described as follows:

The signal processing described here, uses an inverted tree approach. In this approach, the outer or higher level categorizations of the sound syllable are identified first. Then inner or lower level categorizations are identified. Therefore, first the gender of the sound is identified. Gender is considered the outer most categorization, since it shifts the whole energy spectrum to higher level for the female gender. After that the source of sound region in the vocal system is identified since the sound emanating from different regions of the human vocal system bear different and unique signature characteristics. After that the length, then finally the vowel variation are identified. Finally one of four or five sounds from that particular region of the vocal system is identified.

The gender and vocal system region identification is done by parsing the sound energy into time and frequency bands. The area covered by an overlap of a frequency band and a time band is called an energy patch. An energy patch representing an energy pattern in time and frequency uniquely represents a sound syllable.

If the energy lies in a defined frequency band representing a region of the vocal system, the sound syllable is then from that category. It is believed that the frequency range or band progressively changes to other ranges when sound is produced from aspiration to back palate to upper palate, to front palate, to lips and then to nasal passage within the gender band.

Once the sound source is identified by the frequency band, then the length categorization is attempted by measuring the length of time band into which the energy is spread along the y axis. The consistency of energy over time in a given band determines the length. Quarter long sounds are an exception, as they ride over the basic sound making a compound sound and have no length duration. Only few basic sounds ride over other sounds, and are therefore determined by the basic syllable signature. After that the identification of the vowel variations is done by looking for vowel characteristics. After that the basic sound, as one of the few from that vocal location is identified by relative magnitude and spatial relation of the frequency components.

Signature characteristics that distinguish one sound over another sound are determined by examining the three dimensional plot. The characteristics are arrangement of groups of frequency pattern along the y axis, identified by peaks and valleys, the change in frequency pattern over time, characterized by peaks and valleys along the x axis. Some of these characteristics are similar for a group of sounds emanating from the vocal system. For example the sounds that emanate from upper palate would have the characteristics of upper palate and so on.

Therefore a Sound Syllable Recognition Characteristic (SSRC) matrix is prepared for the sounds as described below, which is then used in deciphering them.

Let the spread of sound energy in time and frequency axis is represented by peaks as Pk1 (f1,t1), Pk+1 (f2,t2), . . .

Pkn(fn,tn). A peak is defined, as that energy cell location, whose sound energy is greater than the energy in all of its eight surrounding cells.

A peak and its peak characteristic is defined as the function of the slopes from four different directions of the peak. If a peak Pk is comprised of the twenty five data points along time and frequency axis as follows:

$Ak(t)(f), Ak(t-2)(f), Ak(t-1)(f), Ak(t+1)(f), Ak(t+2)(f),$
$Ak(t)(f-2), Ak(t-2)(f-2), Ak(t-1)(f-2), Ak(t+1)(f-2),$
$Ak(t+2)(f-2), Ak(t)(f-1), Ak(t-2)(f-1), Ak(t-1)(f-1),$
$Ak(t+1)(f-1), Ak(t+2)(f-1), Ak(t)(f+1), Ak(t-2)(f+1),$
$Ak(t-1)(f+1), Ak(t+1)(f+1), Ak(t+2)(f+1), Ak(t)(f+2),$
$Ak(t-2)(f+2), Ak(t-1)(f+2), Ak(t+1)(f+2), Ak(t+2)(f+2),$ where in A(t)(f), A is the sound energy level at time t and frequency f.

Then peak slope is determined as follows:

if slope along the time axis $Pkts = Pktsrise + Pktsfall$,
where;
$Pktsrise = \{Ak(t-1)(f) - Ak(t-2)(f)\} + \{Ak(t)(f) - Ak(t-1)(f)\}$
$Pktsfall = \{Ak(t+1)(f) - Ak(t+2)(f)\} + \{Ak(t)(f) - Ak(t+1)(f)\}$
and
if slope along the frequency axis $Pkfs = Pkfsrise + Pkfsfall$,
where;
$Pkfsrise = \{Ak(t)(f-1) - Ak(t)(f-2)\} + \{Ak(t)(f) + Ak(t)(f-1)\}$
$Pkfsfall = \{Ak(t)(f+1) - Ak(t)(f+2)\} + \{Ak(t)(f) - Ak(t)(f+1)\}$ Then Peak Characteristic (Pkc) is a function of peaks's amplitude, peaks's rise and fall slopes along the time axis, and peaks's rise and fall slopes along the frequency axis. or Pkc=function(Pktf, Pktsrise,fall, Pktfrise,fall)

Spatial Relationship (SR) between peaks in a frequency and time band patch is defined as the summation of diagonal distances between peaks:

$$SR=\{Pktf-P(k+1)t1f1\}$$

Then, Sound Syllable Recognition Characteristic (SSRC) is:
SSRC=F(frequency band, time band, SR, Pkc, Pk+1c, Pk+2c . . . ), where function F is a function of spatial relationship of peaks, peak characteristics, and time and frequency location of the syllable energy patch.

SSRC it is believed, uniquely represents speech attribute of vocal system. Each basic syllable and its variation is identified by a SSRC. It is calculated from the signature to identify a particular sound.

Array of digitally Fourier transformed numbers over overlapping time segments is stored in an array in a revolving buffer. Sound energy data dimensioned by the cell location in time and frequency is first normalized. Tha data is first normalized by subtracting the magnitude from a fraction Th of the average of the cell's magnitude. This normalization produces cells with zero noise, making the cells whose output does not aid in speech recognition zero as well as eliminating the effect of sound volume. The data is then normalized in frequency domain by shifting the frequency range over which the energy is spread to a nominal value. This eliminates the frequency shift caused by different persons speaking the same sound syllable. The amount of frequency shift is determinative of gender and is identified and is saved as a gender bit in the digital storage word described later.

After the recognition of the sound syllable from the sound ensemble, the results are stored using digital storage as described below:

Digital storage in a computer format for a sound syllable is described. In a digital storage word of 16 bits, for example, five bits are assigned to the basic sound, two are assigned to its length, and four are assigned to the vowel variation, using up 11 bits. One bit is for gender identification. One bit is to identify the syllable as belonging to a word group. The other 3 bits are reserved. One of them may be used for error checking, and two bits may be used for language class identification. Of the five bits for basic sound, three are used for sound location within the vocal system, and two are used for sound variation from that location, yielding storage of upto 32 basic sound syllables.

Gender identification is used to place the sound in one of two frequency bands based on the difference in pitches of male and female voices. The language identification is used for classes of language than can be grouped based on certain distinguishable traits apparent in the energy spectrum. These identifications once made, can be used for ease in speech processing.

Therefore using this digital storage scheme, a 16 bit word would identify a basic sound syllable and its variation in length and vowel, irrespective of the language or the person. The sentence "A quick brown fox jumps over a lazy dog", has twenty sound syllables, and thus would require twenty 16 bits of words for digital storage. This is believed to be a tremendously efficient storage.

Once the basic sound syllables are stored in digital storage they can then be processed to determine the language spoken and the meaning of the words.

The first step in deciphering the meaning of words is to take each word in a digital word group and map or equate it to a known word. To perform this mapping, the words of the language are arranged in tables sorted by their sound syllables. Pronunciation variations, including the effect of accent on the sound syllable as part of a word are included in the table. A table look up would thus yield the meaning of the word. If there are more than two words, that have the same sound syllables, they are identified for further context based identification rules. A sample table is shown as follows:

| Word sound | Word | Numerical Code |
|---|---|---|
| ta b l | table | 10010n |
| ta k n | taken | 10011v |
| ta m | taim | 10012v |
| ta l r | tailor | 10013v |
| ta s t | taste | 10014v |
| to t l | total | 10020v |
| to k n | token | 10021n |
| to t m | totem | 10022n |
| tee k | teak | 10030n |
| tee z | tease | 10031v |
| tee m | team | 10032n |
| thi n | thin | 10110a |
| thi n k | think | 10111v |
| thi n g | thing | 10112n |
| tha ee | thigh | 10113n |
| tho t | thought | 10114n |
| da n s | dance | |
| dau t r | daughter | | and so on, where the letters in the numerical code represent word category such as a for adjective/adverb, v for verb, n for noun etc.

First, as an option, the language identification is attempted. The method of language identification, is that the device computes a running histogram of the sound syllables. When the histogram matches a language characteristic, language identification is achieved. It is believed that each language or a group of languages from a region is characterized by the predominant occurrence of certain sound syllables. It is this characteristic, in fact, that gives the language its unique sounding ability. Therefore a running histogram, computing syllable count, is a indicator of a language or a similar sounding language class. After enough syllables have been spoken to characterize the language by a histogram of occurrence of the syllables, the language is identified.

After the language identification, each word is matched with known words from that language. Each word is equated to one of the known words, by attaching a 16 bit word code to the word group. A 16 bit code, using 14 bits of the 16 identifies upto 16000 words, the other two bits being used for word category.

Therefore, at this time, we have a group of digital words, each digital word representing a syllable and a reference to a word. The last word, the reference word, is the word identification. This group of words preserves the original speech and its identification in a very compact and efficient manner.

For example, a word made of three syllables, such as word "total", would have three digital words identifying the three spoken syllables that comprise it and a fourth digital word that contains its word identification. These four words contain the unique and complete identification, for word "total" in how it was spoken and what it means.

Refer to FIG. 1. The speech processor is a device is made of an input processing element (1), an output processing element (2), a data storage element (3), an analog to digital converting element (4) and a central processing element (5).

This device has embedded in it logic for speech syllable identification (6), speech syllable recognition (7), speech syllable storage (8), and speech deciphering (9). In addition there is a speech syllable generation component made of an articulating element (10). The articulating element articulates individual sound syllables under programmable control by the central processing element via the output processing element.

An analog speech signal (11) is input to the analog to digital converting element and the output is a digital speech signal (12) which is stored into the data storage element by the input processing element.

See FIG. 2. In the speech syllable identification logic (6), the computer processing element repeatably reads a sequence of the digital speech signal from the data storage element, and performs digital Fourier transformation on successive and overlapping segments of the digital signal (13). The transform output data is stored in an array in the data storage element, with each array cell location representing the frequency f and time t, and each cell magnitude representing the sound energy amplitude at that frequency and at that time (14). Consider, for reference, the time dimension of the array being along the X axis, the frequency dimension of the array being along the Y axis and the amplitude of sound energy being along the Z axis in cartesian coordinate system.

Sound energy data referenced by its cell location in time and frequency is normalized. The data is first normalized by subtracting the magnitude of each cell from a threshold determined as the fraction of the average of the cell's magnitude (15). This normalization makes the cells whose output does not aid in speech recognition zero as well as eliminates the effect of sound volume. The data is then normalized in frequency domain by shifting the frequency range over which the energy is spread to a nominal value (16). This eliminates the frequency shift caused by different persons speaking the same sound syllable. The amount of frequency shift for normalization is saved for later use in speech syllable recognition logic.

The central processing element then processes the normalized data to partition it into Syllable Energy Patches (SEPs) (17). A SEP is an area covered by an intersection of a time band and a frequency band. The start and end of a band is calculated on the relative magnitude of the sound energy. The start of a frequency band is computed when the energy along the Y axis exceeds a threshold, the end of the band being computed when the energy falls below a threshold (18). The start of a time band is computed when the energy along the X axis exceeds a threshold, the end of the band being computed when the energy falls below a threshold (19).

The Syllable Energy Patches identified by the start and end of the frequency band and the start and end of the time band are saved for further processing (20).

The central processing element computes a speech syllable recognition signature based on the location of SEP and on the number of peaks of the energy in the SEP (21). A peak being defined as any cell location, in which the sound energy is greater than the sound energy in any of its surrounding cells.

The speech syllable recognition logic (7) compares the speech syllable recognition signature with a known Syllable Recognition Characteristics (SRC) in recognizing the speech syllable.

The source of sound in the vocal system is identified since the sound emanating from different regions of the human vocal system is believed to have a frequency range that progressively changes to other ranges. These regions of the human vocal system are: (a) tongue using rear palate, (b) tongue using upper palate, (c) tongue using front palate just behind the front teeth, (d) tongue using teeth and lower lip, (e) lips, (f) aspiration with tongue in different areas modulating air flow, and the (g) nasal resonance combination.

The start and end frequency of the SEP will place syllable as one emanating from one of the regions of the vocal system. The duration of the syllable is measured by the start and end time of the SEP. The consistency of energy over time in the SEP determines the duration as either half or full.

After that the recognition of the vowel variations is done by matching the vowel characteristics in the SEP with SRC. The possible vowel variations can be approximated with these sounds: a, aa, e, ee, o, oo, ai, aii, ao, auo, ung and ah.

After that the root sound, as one of the few from that vocal system region is recognized by comparing the relative magnitude and spatial relationship of the frequency components in the SEP to the SRC.

Refer to FIG. 3. The sequence of processing steps to recognize the syllable from the SEP is as follows:

Compare the current SEP's time start with previous SEP's time end to determine word boundary and set word boundary sub-code (21). Time difference exceeding a threshold indicates a syllable of a new word. Compare the SEP's frequency start and end to determine vocal system region of the syllable and set vocal region sub-code (22). Compare the SEP's time width to determine syllable duration and set syllable duration sub-code (23). Compare SEP signature with SRC to determine the vowel and set vowel sub-code (24). Compare SEP's signature with SRC to determine the syllable and set the syllable sub-code (25). As an option, the amount of frequency shift for normalization saved earlier is compared to a threshold to determine gender of the person speaking the syllable and is saved as a gender sub-code. Store these syllable recognition sub-codes in a digital word in the digital storage element (26).

The speech syllable storage logic (8) stores the speech syllable by a numerical code in a digital word. The numerical code has sub-codes for basic speech syllable, vowel variation of the root speech syllable, vocal system region the speech syllable emanated from, and the duration of the syllable. The numerical code may further comprise a sub-code for gender based sound syllables, and a sub-code for language characteristic.

Refer to FIG. 4. The numerical code is arranged as a 16 bit data word in digital storage. For example, two bits are assigned to the basic syllable (27), three bits are assigned to the vocal system region (28), four bits are assigned to the syllable's vowel variation (29), and two bits are assigned to the syllable duration using up 11 bits. One bit is assigned for gender identification or the amount of frequency shift for normalization (31). One bit is assigned to identify the syllable as belonging to a word group or start of a word (32). The other 3 bits are reserved. One of them may be used for error checking, and two bits may be used for language class identification (33). Five bits, combined for basic syllable and vocal system region, yield storage of upto 32 root sound syllables.

A syllable word is stored as a string of ordered syllables in the form of a digital word for each of its syllable and one additional digital word for code identifying the language word. For example, a syllable word made of three syllables, such as word "total", would have three digital words identifying the three syllables that comprise it and a fourth digital word that contains its language word identification (34). These four digital words contain the unique and complete identification, for word "total" in how it was spoken and what it means. Similarly, a speech sentence is stored as a string of the ordered syllable words as described above and speech is stored as a string of ordered sentences. The syllable word is deciphered by using speech deciphering logic described below.

The speech deciphering logic (9), uses syllables of the spoken word stored in digital words to find a known equivalent language word for it. For this purpose a syllable based language dictionary is kept in the digital storage element. In this dictionary the language words are organized and sorted along the sound syllables as opposed to alphabetically organized as in an ordinary dictionary. This dictionary database stores each language word in three fields. One field contains its syllable equivalent, one field, the word itself as spelled in the language, and one field a numerical identification of the word. Search of the database keyed to the syllables, by the central processing element, would thus yield the meaning of the word and its numerical identification. This numerical identification is saved as the last word in the word group representing the syllable word.

Once the syllable word is identified as described above, the central processing element can process a non speech or speech response based on the logic for a particular application of this device. The speech response is articulated via an articulating element.

For speech syllable generation, the data storage element has stored in it the numerical codes of the speech syllable ensemble. An articulating element converts the numerical codes to a spoken form. An interface via the output processing element provides a programmable sequence in time of command codes representing speech syllables to the articulating element.

Refer to FIG. 5, which shows the sequence of processing steps to decipher the meaning of word and to form a speech response using the articulating element. Look up syllable dictionary database to map the syllable word to a language word and find its identification code (35). Store the language word identification code next to the sound syllables words in the data storage element (36). Process the speech word in the data storage element for individual applications (37). For an application requiring speech response, parse the response into sound syllables of which the response words are made of (38). Send commands for sound syllables to the articulating element (39).

FIGS. 6A and 6B show SEP and its characteristics which make up SSRC, where time axis (41), frequency axis (42), energy axis (43), vocal region frequency band dividing lines (44), inter-syllable time gap (45), inter-word time gap (46), Syllable Energy Patch (SEP) (47), start time of a SEP (48), end time of a SEP (49), start frequency of SEP (50), end frequency of SEP (51), energy peak location (52), peak's magnitude (53), peak's ascending frequency slope (54), peak's descending frequency slope (55), peak's ascending time slope (56), peak's descending time slope (57), peak's spatial relationship with other peaks by diagonal distance between them (58), and number of peaks (59) are shown.

Optionally the language of speech can be deciphered by calculating the frequency of occurrence of the speech syllables and then comparing that to known language specific frequency of occurrences, leading to identification of the language. It is believed each language bears a preponderance of occurrence of a select few syllables, which give its unique sounding ability.

To identify language the central processing element computes a real time histogram of the count of occurrence of different sound syllables in the speech. When the histogram results match a language characteristic, language identification is achieved. It is believed that each language or a group of languages from a region is characterized by the predominant occurrence of certain sound syllables. It is this characteristic, in fact, that gives the language it's unique sounding ability. Therefore a histogram, computing syllable count, is a indicator of a language or a similar sounding language class. After enough syllables have been spoken to characterize the language by a histogram of occurrence of the syllables, the language is identified.

The language class can optionally be coded in two bits of the word representing a speech syllable as shown in FIG. 4.

Although the present invention has been described in considerable detail with regard to the preferred version thereof, other versions are possible. Therefore the appended claims should not be limited to the description of the preferred version contained herein.

What is claimed is:

1. A speech deciphering device comprising:
 (a) a digital device having an input processing element, a central processing element, a data storage element, an output processing element and an analog to digital converting element;
 (b) therein being present logic in the digital device, for
  (1) segmenting in time and frequency speech syllables,
  (2) recognizing the speech syllable by its constituting components of vocal region, root syllable, vowel variation and syllable duration,
  (3) represent for storage the individual speech syllable by its constituting components used in syllable recognition, and
  (4) deciphering speech made up of the time sequence of speech syllables by mapping a syllable sequence arranged speech word to a known language word using a syllablically arranged dictionary.

2. The speech deciphering device of claim 1, wherein, the speech syllable segmenting in time and frequency logic comprising:
 (a) input to the analog to digital converting element of an amplitude versus time speech signal, and the output being a digital speech signal;

(b) input processing element storing the digital speech signal into the data storage element;

(c) the computer processing element repeatable reading a sequence of the digital speech signal from the data storage element, and performing digital fourier transformation on successive segments of the digital signal, where the transform output data stored in an array in the data storage element, with each array cell location representing the frequency and time, and each cell magnitude representing the sound energy amplitude at that frequency and at that time;

(d) the transform output data being normalized in frequency and magnitude;

(e) the central processing element processing the normalized data to partition it into Syllable Energy Patches (SEP), where SEP is an area covered by an intersection of a time band and a frequency band, start and end of a band being calculated on the relative magnitude of the sound energy exceeding a threshold;

(f) the central processing element computing a speech syllable recognition signature based on the SEP's time and frequency identification and peaks of the energy in the SEP, a peak being defined as any cell location, in which the sound energy is greater than the sound energy in its surrounding cells.

3. The speech deciphering device of claim 2, wherein, the speech syllable recognition logic comprising:

(a) the central processing element comparing the speech syllable recognition signature with a know speech syllable recognition characteristic (SSRC) in recognizing the speech syllable;

(b) SSRC being a distinguishing pattern for each syllable wherein SSRC is a function of SEP's location in time and frequency, of the number of peaks, each peak's slopes along the time axis and along the frequency axis, spatial relationship of the peaks, and magnitude of the peaks.

4. The speech deciphering device of claim 3, wherein, the speech syllable storage logic comprising;

(a) storing the speech syllable by a numerical code in a digital word;

(b) the numerical code having individual sub-codes for root speech syllable, region of the vocal system speech syllable emanated from, vowel variation of the root speech syllable, and duration of the speech syllable.

5. Speech storage logic as in claim 4, wherein the numerical code further comprising:

(a) a sub-code for gender based sound syllables;

(b) a sub-code for language class.

6. Speech syllable storage logic as in claim 5, wherein the digital word for numerical code arranged as a 16 bit data word.

7. Speech storage logic as in claim 4, wherein, a string of ordered syllables is stored as a word, a string of ordered words is stored as a sentence, and a string of ordered sentences is stored as a discourse.

8. The speech deciphering device of claim 4, wherein, the speech deciphering logic comprising:

(a) the data storage element having a syllablically arranged dictionary of a language, in which the language word are sorted by their speech syllables and the language words are encoded by their grammatical structure attribute in the language;

(b) the central processing element mapping a syllable sequence arranged speech word to a known language word using the syllablically arranged dictionary, leading to language word and its grammatical structure decipher.

9. The speech deciphering device as in claim 1, further comprising:

a device component generating a speech syllable equivalent to the recognized speech syllable.

10. The device as in claim 9, wherein the speech syllable generation component comprising:

(a) the data storage element having stored the codes representing the ensemble of spoken speech syllables;

(b) an articulating element which converts the codes to a spoken form;

(c) an interface to the digital device, over which commands are received to transfer sequence of speech syllables codes from the data storage element to the articulating element.

11. A device as in claim 10, wherein the interface being a programmable sequence in time of command codes representing speech syllables of speech words and sentences.

12. A speech deciphering method, comprising the steps of:

(a) using a speech data output in the form of an array of numbers which represent the result of computation of overlapping DFT computation of digitized time domain speech signal;

(b) segmenting the array output in time, wherein the segmentation composed of time bands and inter time band gaps based on the variation in magnitude of energy;

(c) segmenting the array output in frequency, wherein the segmentation composed of one of seven frequency bands corresponding to the vocal regions, based on magnitude of energy;

(d) locating a Syllable Energy Patch (SEP) as an energy pattern over an area that overlaps the intersection of the time band and the frequency band, such that the SEP corresponding to an energy pattern representing a speech syllable;

(e) deriving a speech syllable recognition characteristic (SSRC) function for each SEP, wherein the SSRC is a function of SEP's start and end frequencies, start and end time interval, number of peaks, for each peak, its magnitude, location, ascending and descending slope in time and frequency, spatial relationship of peaks via their diagonal distances.

13. The speech deciphering method, as in claim 12, further comprising the step of:

(a) mapping the SSRC into a table of syllable identification codes, wherein each code comprised of sub-codes corresponding to one of set of possible alternatives composed of vocal region, root syllables, root syllable's vowel modulation, and length caused variation.

14. The speech deciphering method, as in claim 13, wherein, the sub-codes further comprising the step of: language class, based on identification of language class by histogram of occurrence of syllables.

15. The speech deciphering method, as in claim 14, further comprising the step of: a sub-code comprising gender class based on shift in frequency spectrum required to normalize in frequency.

16. The speech deciphering method, as in claim 15, further comprising the steps of: making a word string from a group of syllables separated by a inter word gap.

17. The speech deciphering method, as in claim 16, further comprising the steps of:
   (a) having a syllablically arranged dictionary of a language, in which the language word are sorted by their spoken speech syllables;
   (b) mapping the word composed of syllable identification codes into dictionary words, thereby identifying the speech word.

18. The speech deciphering method, as in claim 17, further comprising the steps of: where the dictionary word is encoded with a sentence structure grammar attribute.

19. A speech syllable based dictionary useful in deciphering speech using digital computing device, comprising:
   (a) a database with at least two fields;
   (b) the first field storing a sequence of speech syllable codes of which a language word is composed such that these syllable based language words are sorted in the order of their syllables from speech pronunciation;
   (c) the second field storing equivalent language words such that the database can be searched, based on the syllable based language word, and its equivalent language word found.

20. The speech syllable based dictionary as in claim 19, wherein, the fields further comprising: an additional field storing a representation of grammatical attribute, within the sentence structure, of the language word.

* * * * *